(12) United States Patent
Masuda

(10) Patent No.: US 8,873,937 B2
(45) Date of Patent: Oct. 28, 2014

(54) AUDIOVISUAL DATA TRANSMISSION SYSTEM AND AUDIOVISUAL DATA TRANSMISSION METHOD

(75) Inventor: Hiroshi Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 13/474,808

(22) Filed: May 18, 2012

(65) Prior Publication Data

US 2013/0308924 A1  Nov. 21, 2013

(51) Int. Cl.
*H04N 5/76* (2006.01)

(52) U.S. Cl.
USPC .......................................... 386/283; 386/285

(58) Field of Classification Search
None
See application file for complete search history.

(56) References Cited

U.S. PATENT DOCUMENTS 8,126,313 B2 * 2/2012 Haot et al. .................... 386/278
8,285,967 B1 * 10/2012 Veeraswamy et al. ........ 711/202

FOREIGN PATENT DOCUMENTS

JP 9-319523 12/1997

* cited by examiner

*Primary Examiner* — William C Vaughn, Jr.
*Assistant Examiner* — Eileen Adams
(74) *Attorney, Agent, or Firm* — Frommer Lawrence & Haug LLP; William S. Frommer

(57) ABSTRACT

An audiovisual data transmission system includes the following components. A filesystem module creates a file that contains at least one of video data and audio data stored in a storage unit. A conversion processing unit manages a file created by the filesystem module. A filesystem-in-userspace module provides an interface between the conversion processing unit and the filesystem module. An update detecting unit detects an update of at least one of video data and audio data contained in a file. In response to an instruction to acquire a file managed by the conversion processing unit received in a state where an update of the file is detected by the update detecting unit, a server makes an inquiry to the conversion processing unit and repeatedly performs a read process in which the file is read, via the filesystem-in-userspace module.

6 Claims, 5 Drawing Sheets

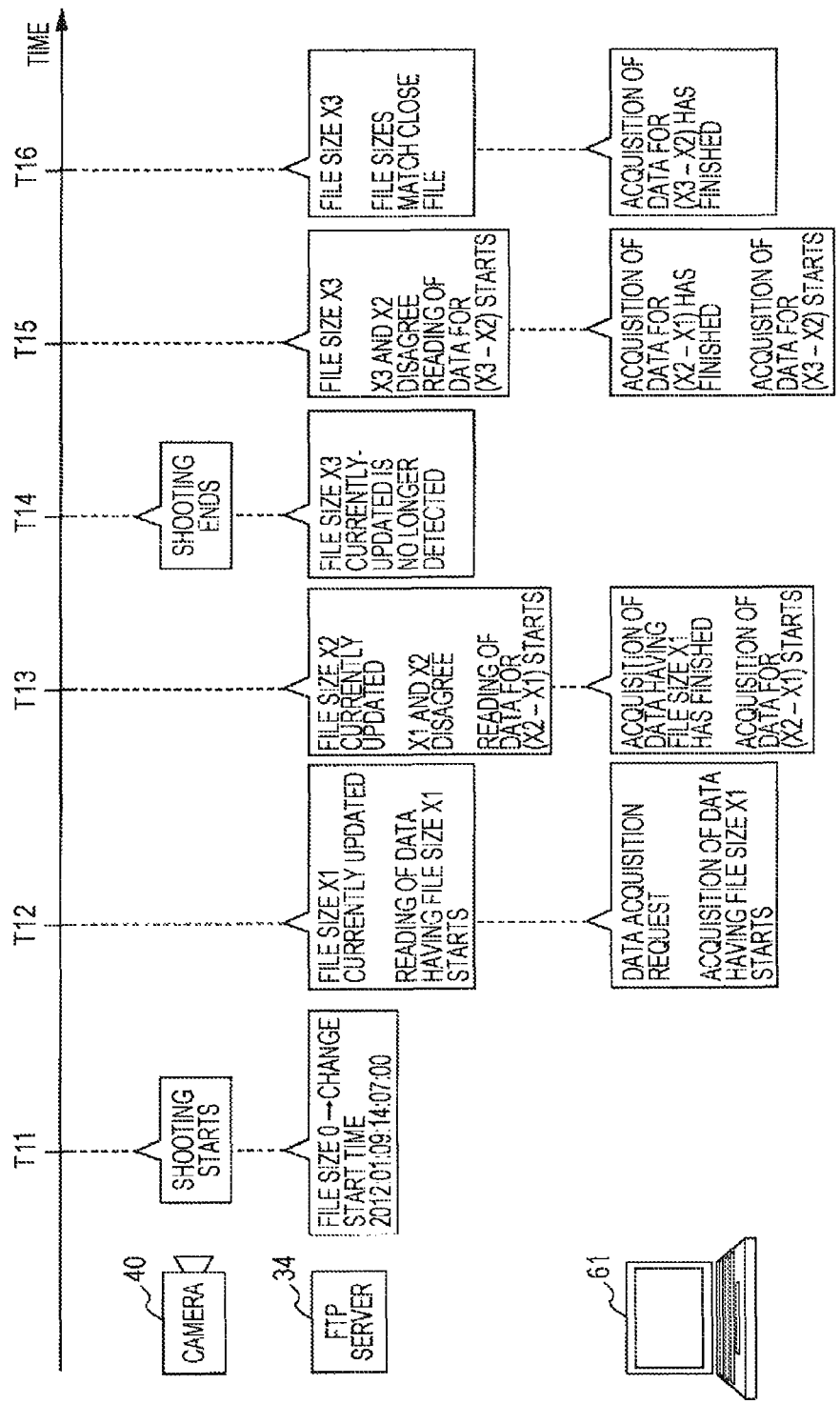

AUDIOVISUAL DATA TRANSMISSION SYSTEM AND AUDIOVISUAL DATA TRANSMISSION METHOD

BACKGROUND

The present disclosure relates to an audiovisual data transmission system and an audiovisual data transmission method for transmitting at least one of video data and audio data (hereinafter, referred to as "AV data") accumulated in storage.

AV data accumulated in storage is managed by a filesystem on a "file-by-file" basis. Most operating systems (hereinafter, abbreviated as "OS") include a filesystem as a standard tool thereof. Thus, a filesystem included in an OS as a standard tool is generally used.

When AV data of each file accumulated in storage is read, a protocol for file transfer which is compliant with the filesystem is used. As the protocol for file transfer, for example, a protocol called file transfer protocol (FTP) is often used. FTP is defined as an application-layer protocol that uses transmission control protocol (TCP), which is widely used for transferring data over the Internet or the like.

When an AV data reproducing apparatus reads AV data accumulated in storage by using FTP, the AV data reproducing apparatus serves as an FTP client, whereas a controller of the storage serves as an FTP server. The FTP client requests the FTP server to acquire a file containing desired AV data. The FTP server reads the AV data of the file specified by the FTP client from the storage, and transfers the read AV data to the FTP client.

SUMMARY

FTP is a common protocol for file transfer. The use of FTP as the transfer protocol allows a server to transfer AV data to various devices. Generally, data that is to undergo FTP-based transmission has a determined file size. Accordingly, it is difficult to transmit AV data of live video that is being captured by a camcorder, by using FTP without any additional measures. Specifically, AV data of live video is continuously accumulated in storage until broadcasting thereof ends. If the client instructs the server to acquire AV data of the live video by using FTP at a specific time point, the AV data that has been accumulated in the storage of the server up to that specific time point is transferred but the AV data of the live video captured after the specific time point is not acquirable without any additional measures.

In order to transmit AV data having a non-determined file size, such as AV data of live video, a dedicated protocol different from FTP and a dedicated filesystem are often used. Japanese Unexamined Patent Application Publication No. 9-319523 discloses a dedicated filesystem suitably used for AV data.

However, preparation of a dedicated filesystem for transmission of AV data involves allocation of a module, which executes the dedicated filesystem, in the kernel space of the operating system, which executes an AV data transmission process. However, this is not preferable because the system configuration becomes more complicated.

Accordingly, it is desirable to easily transmit AV data having a non-determined size, such as AV data of live video, by using a protocol for AV data having a determined file size.

An embodiment of the present disclosure is applied to an audiovisual data transmission system including a filesystem module, a conversion processing unit, a filesystem-in-userspace module, an update detecting unit, and a server. The filesystem module creates a file that contains at least one of video data and audio data stored in a storage unit. The conversion processing unit manages a file created by the filesystem module. The filesystem-in-userspace module provides an interface between the conversion processing unit and the filesystem module. The update detecting unit detects an update of at least one of video data and audio data contained in a file.

In response to an instruction to acquire a file managed by the conversion processing unit received in a state where an update of the file is detected by the update detecting unit, the server makes an inquiry to the conversion processing unit via the filesystem-in-userspace module and repeatedly performs a read process in which the file is read via the filesystem-in-userspace module.

An audiovisual data transmission method according to an embodiment of the present disclosure includes 1) creating a file that contains at least one of video data and audio data stored in a storage unit, 2) managing a file created in the creating of a file, 3) providing an interface between a management process performed in the managing of a file and a file creation process performed in the creating of a file, in a kernel space of an operating system, 4) detecting an update of at least one of video data and audio data contained in a file, and 5) in response to an instruction to acquire a file managed in the managing of a file received in a state where an update of the file is detected in the detecting of an update, making an inquiry to the managing of a file via the interface provided in the providing of an interface, and repeatedly performing a read process in which the file is read via the filesystem-in-userspace module.

According to the embodiments of the present disclosure, the server makes an inquiry to the conversion processing unit via the filesystem-in-userspace module and performs a file read process via the filesystem-in-userspace module. Thus, the conversion processing unit that performs a process of reading AV data having a variable file size is allocated in the user space of the operating system.

BRIEF DESCRIPTION OF THE DRAWINGS

FIG. 5 is an explanatory diagram illustrating an example of an operation of reading data according to an embodiment of the present disclosure.

DETAILED DESCRIPTION OF EMBODIMENTS

Examples of an AV data transmission system and an AV data transmission method according to embodiments of the present disclosure will be described below with reference to the accompanying drawings in the order as follows:

1. Example of configuration of entire system (FIG. 1),
2. Example of configuration for reading virtual file (FIG. 2),
3. Example of procedure of read operation (FIGS. 3 and 4), and
4. Example of specific read operation (FIG. 5).

It should be noted that the present disclosure is not limited to the examples below.

1. Example of Configuration of Entire System

Figure 1:
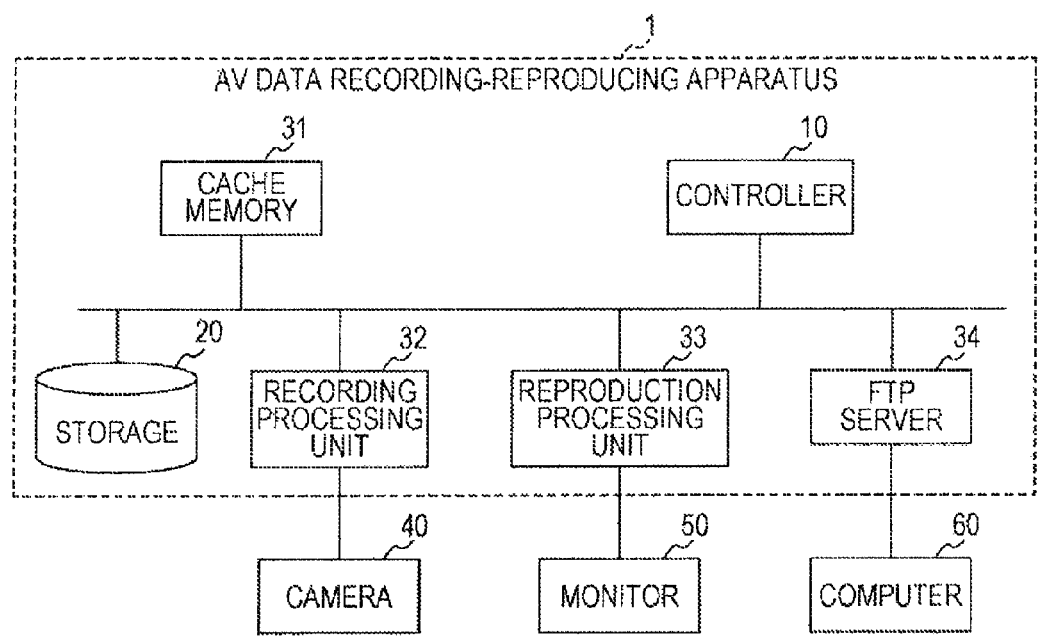
FIG. 1 is a block diagram illustrating an example of a configuration of an AV data transmission system according to an embodiment of the present disclosure.

FIG. 1 is a block diagram illustrating an example of a configuration of an AV data transmission system according to an embodiment of the present disclosure.

An AV data recording-reproducing apparatus 1 included in the AV data transmission system according to the embodiment of the present disclosure includes storage 20 in which AV data is recorded. The AV data includes video data and audio data. A controller 10, which is included in the AV data recording-reproducing apparatus 1, controls recording of AV data in the storage 20 and reproduction of the AV data. In the controller 10, software of the operation system (OS) that controls the storage 20 is implemented. The OS has the kernel space and the user space. The kernel space is a layer in which hardware, such as the storage 20, is driven. The user space is a layer in which application programs are executed.

When the controller 10 executes a process of recording AV data in the storage 20 and a process of reproducing the AV data, the controller 10 uses a cache memory 31, which is included in the AV data recording-reproducing apparatus 1, to temporarily store the AV data.

The AV data recording-reproducing apparatus 1 also includes a recording processing unit 32, a reproduction processing unit 33, and an FTP server 34. Under control of the controller 10, the recording processing unit 32 records AV data input from a camera 40 or the like in the storage 20. Under control of the controller 10, the reproduction processing unit 33 supplies a monitor 50 with AV data read from the storage 20. The FTP server 34 transfers AV data read from the storage 20, as a file, to a computer 60 by using FTP. The computer 60, for example, edits the supplied AV data. A file to be transferred from the FTP server 34 to the computer 60 is a virtual file created by a virtual filesystem module, which will be described later. Data to be transferred from the FTP server 34 to the computer 60 may be constituted by one of video data and audio data. Additionally, AV data to be transferred as a file may be attached with metadata, which is additional data of the AV data.

2. Example of Configuration for Reading Virtual File

Figure 2:
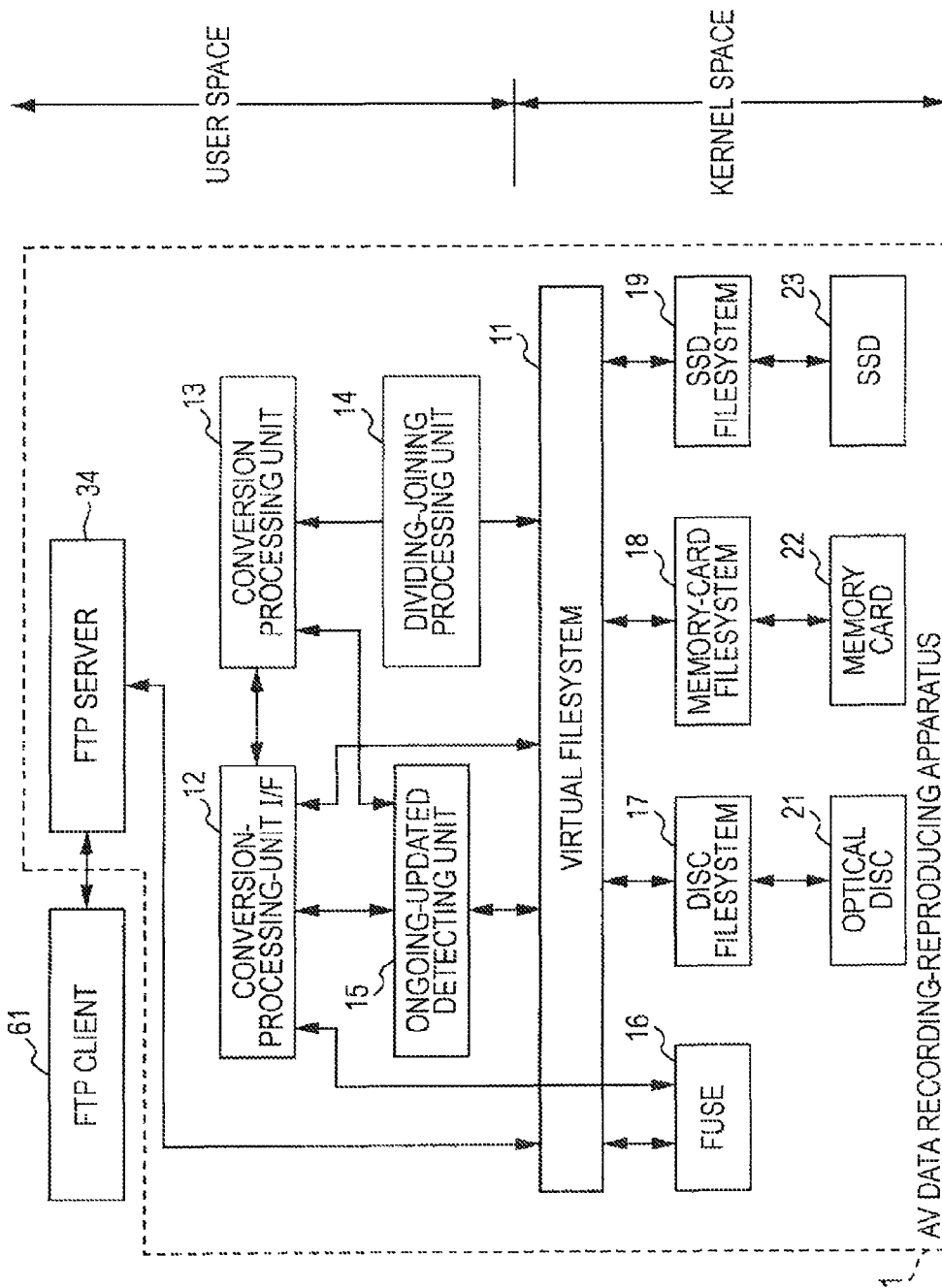
FIG. 2 is a block diagram illustrating an example of a configuration of an AV data recording-reproducing apparatus according to an embodiment of the present disclosure.

Next, a configuration in the AV data recording-reproducing apparatus 1 will be described, the configuration being used when the FTP server 34 transfers AV data recorded in the storage 20 to the computer 60. In FIG. 2, the computer 60 is illustrated as an FTP client 61 that receives a file by using FTP.

As illustrated in FIG. 2, the AV data recording-reproducing apparatus 1 includes an optical disc 21, a memory card 22, and a solid state drive (SSD) 23 as the storage 20 that stores AV data. The SSD 23 is a mass storage device realized with a flash memory. The optical disc 21 and the memory card 22 are removable from the AV data recording-reproducing apparatus 1. The SSD 23 may be fixed in the AV data recording-reproducing apparatus 1 or may be removable from the AV data recording-reproducing apparatus 1. Although the AV data recording-reproducing apparatus 1 illustrated in FIG. 2 includes all the optical disc 21, the memory card 22, and the SSD 23, the AV data recording-reproducing apparatus 1 may include any one of them. Alternatively, the AV data recording-reproducing apparatus 1 may include storage of other kinds, such as a hard disk drive (HDD).

In the following description, the optical disc 21, the memory card 22, and the SSD 23 are collectively referred to as storage devices when distinction therebetween is not desired.

The AV data recording-reproducing apparatus 1 also includes a virtual filesystem module 11. Data transfer is performed between the virtual filesystem module 11 and the storage devices 21, 22, and 23 via filesystem modules 17, 18, 19 for the storage devices 21, 22, and 23, respectively. Specifically, data transfer is performed between the optical disc 21 and the virtual filesystem module 11 via the disc filesystem module 17. Data transfer is performed between the memory card 22 and the virtual filesystem module 11 via the memory-card filesystem module 18. Data transfer is performed between the SSD 23 and the virtual filesystem module 11 via the SSD filesystem module 19.

The virtual filesystem module 11 is allocated in the kernel space of the operating system implemented in the AV data recording-reproducing apparatus 1.

The virtual filesystem module 11 creates virtual files containing data stored by the storage devices 21, 22, and 23. The virtual files are files having a format in which data stored in the storage devices 21, 22, and 23 is read by the FTP server 34 using FTP. In order to acquire the virtual files, the AV data recording-reproducing apparatus 1 includes a conversion-processing-unit interface (I/F) 12 and a conversion processing unit 13. The conversion processing unit 13 performs a conversion process so as to handle data stored in the storage devices 21, 22, and 23 as data contained in virtual files. The conversion-processing-unit interface 12 serves as an interface between the conversion processing unit 13 and a filesystem-in-userspace (FUSE) module 16, which will be described later.

The conversion-processing-unit interface 12 manages a session in which the FTP server 34 reads a virtual file. The conversion processing unit 13 communicates, via a divining-joining processing unit 14, with the storage devices 21, 22, and 23 connected to the virtual filesystem module 11. Through this communication, the conversion processing unit 13 integrates pieces of AV data separately recorded in the storage devices 21, 22, and 23 into data of one file. The conversion-processing-unit interface 12 and the conversion processing unit 13 are allocated in the user space of the operating system implemented in the AV data recording-reproducing apparatus 1.

The virtual filesystem module 11 is connected to an ongoing-update detecting unit 15. The ongoing-update detecting unit 15 detects that AV data contained in a virtual file created by the virtual filesystem module 11 is being updated. A state where AV data is being updated is a state where AV data is being newly recorded in the storage device 21, 22, or 23. The ongoing-update detecting unit 15 and the dividing-joining processing unit 14 are also allocated in the user space.

Furthermore, the AV data recording-reproducing apparatus 1 includes the FUSE module 16 that provides an interface between the virtual filesystem module 11 and the conversion-processing-unit interface 12 during file transfer. The FUSE module 16 is allocated in the kernel space, and serves as an interface between the kernel space and the conversion-processing-unit interface 12 allocated in the user space. Inclusion of the FUSE module 16 allows the conversion-processing-unit interface 12 and the conversion processing unit 13 to execute unique functions related to virtual files without any modifications of the kernel code handled by the virtual filesystem module 11. Functions that the conversion-processing-unit interface 12 and the conversion processing unit 13 are able to execute via the FUSE module 16 will be described later.

The FTP server 34 transfers a virtual file read from the virtual filesystem module 11, to the FTP client 61 by using FTP.

3. Example of Procedure of Read Operation (FIGS. 3 and 4)

Next, with reference to FIGS. 3 and 4, a description will be given of a procedure of reading AV data stored in the storage 20 when the FTP server 34 transfers the AV data to the FTP client 61 by using FTP. In this example, it is assumed that AV data stored in the storage device (SSD) 23 is read. This process is similarly used when AV data is read from the other storage devices 21 and 22.

Figure 3:
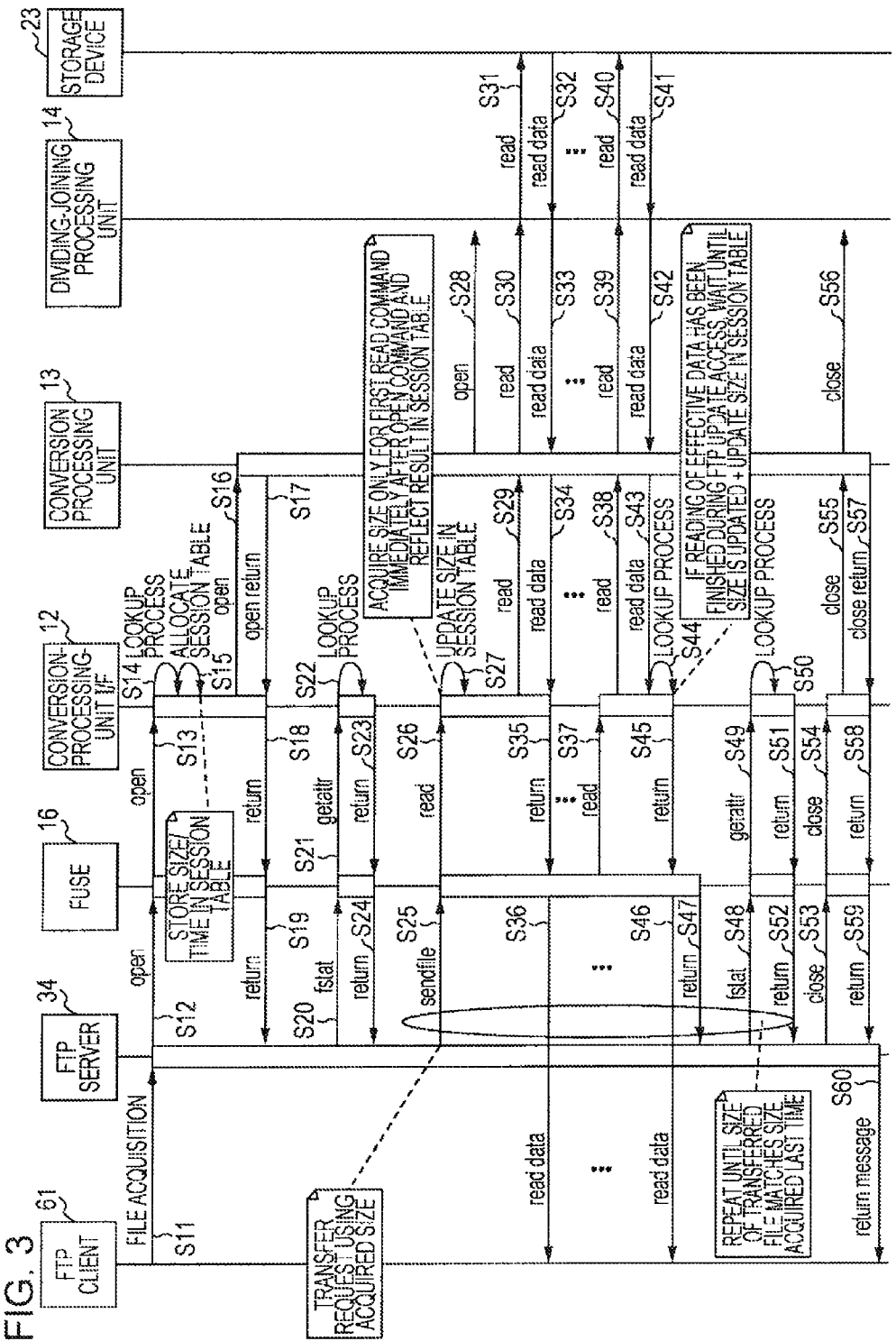
FIG. 3 is a sequence diagram illustrating a procedure of reading data according to an embodiment of the present disclosure.
Figure 4:
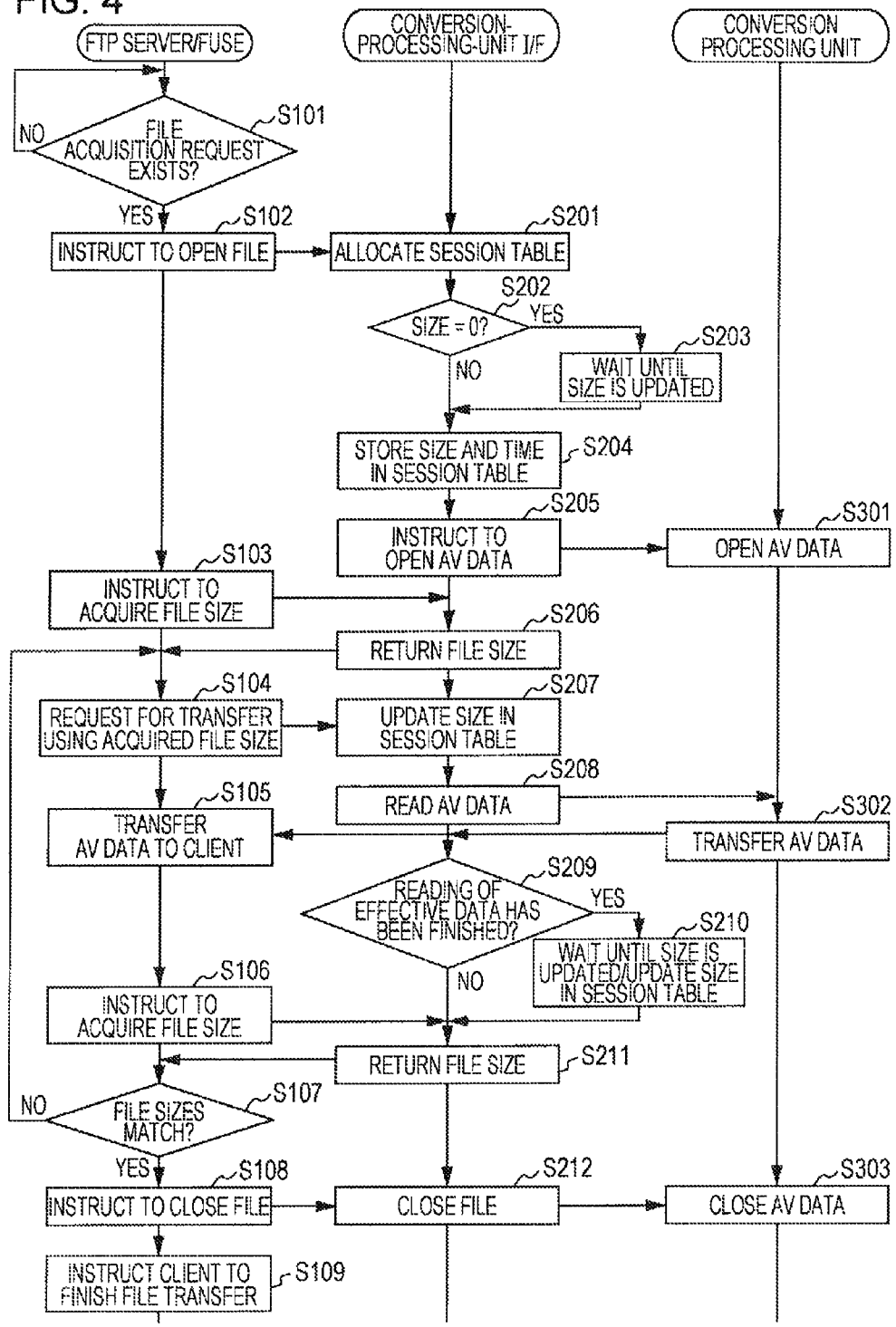
FIG. 4 is a flowchart illustrating a process of reading data according to an embodiment of the present disclosure.

FIG. 3 is a sequence diagram illustrating a procedure of a read operation.

First, as illustrated in FIG. 3, the FTP client 61 instructs the FTP server 34 to acquire a file (step S11). The FTP server 34 having received this instruction executes a system call "open" for opening the specified file, on the FUSE module 16 (step S12). The FUSE module 16 having been invoked by the system call "open" then sends a command "open" to the conversion-processing-unit interface 12 (step S13).

The conversion-processing-unit interface 12 performs a lookup process in which information about the virtual file specified in the command "open" is read (step S14). Then, the conversion-processing-unit interface 12 allocates a session table into which data is to be read from the storage device 23 (step S15). At this time, information, such as the size of the virtual file specified in the command "open" and the creation time of the file, is stored in the allocated session table. Here, the size of the virtual file is an amount of AV data contained in the virtual file.

The conversion-processing-unit interface 12 having allocated the session table then sends a command "open" to the conversion processing unit 13 (step S16). The conversion processing unit 13 having received the command "open" prepares for reading of the specified file. Subsequently, the conversion processing unit 13 returns a command "open return" to the conversion-processing-unit interface 12 (step S17).

The conversion-processing-unit interface 12 having received the command "open return" then sends a command "return" to the FTP server 34 via the FUSE module 16 (steps S18 and S19).

Next, the FTP server 34 having received the command "return" executes a system call "fstat" on the FUSE module 16 in order to acquire information, such as the file size (step S20). The FUSE module 16 having been invoked by the system call "fstat" sends a command "getattr" to the conversion-processing-unit interface 12 (step S21). The conversion-processing-unit interface 12 performs the lookup process on the session table (step S22). In this lookup process, the size of the virtual file held in the session table is read. Subsequently, the conversion-processing-unit interface 12 attaches the read size of the virtual file to the command "return", and sends the command "return" to the FTP server 34 (steps S23 and S24). The FTP server 34 stores the received size of the virtual file therein.

Then, the FTP server 34 executes a system call "sendfile" on the FUSE module 16 in order to makes a request for transfer of the file having the acquired file size (step S25). The FUSE module 16 having been invoked by the system call "sendfile" sends a command "read" to the conversion-processing-unit interface 12 (step S26). The conversion-processing-unit interface 12 having received this command "read" updates the size held in the session table (step S27). Here, the conversion-processing-unit interface 12 updates the size upon receipt of the first command "read" immediately after receipt of the command "open".

Also, the conversion processing unit 13 sends a command "open" to the divining-joining processing unit 14 (step S28).

Subsequently, the conversion-processing-unit interface 12 having received the command "read" in step S27 sends a command "read" to the conversion processing unit 13 (step S29). The conversion processing unit 13 having received the command "read" then sends a command "read" to the storage device 23 via the divining-joining processing unit 14 (steps S30 and S31).

The storage device 23 having received the command "read" sends the specified AV data to the divining-joining processing unit 14 (step S32). The divining-joining processing unit 14 may join (or divide) the AV data. Then, the divining-joining processing unit 14 sends the AV data to the conversion processing unit 13 (step S33).

The conversion processing unit 13 sends the supplied AV data to the conversion-processing-unit interface 12 (step S34). Subsequently, the conversion-processing-unit interface 12 sends, as a file regarding a response "return" to the command "read" sent in step S26, the acquired AV data to the FUSE module 16 (step S35). The FUSE module 16 then sends the AV data of the supplied file to the FTP client 61 via the FTP server 34 (step S36).

If an amount of data acquired by the FUSE module 16 in step S35 has not reached the size of the file specified by the read command, the FUSE module 16 repeatedly sends the command "read" to the conversion-processing-unit interface 12.

In the example illustrated in FIG. 3, it is assumed that the commands "read" are sent from the FUSE module 16 to the storage device 23 sequentially in steps S37, S38, S39, and S40 after such reading of data is performed multiple times. The data read from the storage device 23 in response to these commands is sent to the conversion-processing-unit interface 12 in steps S41, S42, and S43. Then, the conversion-processing-unit interface 12 determines that reading of data having the file size held in the session table has been completed in the lookup process (step S44). The AV data supplied to the conversion-processing-unit interface 12 is sent to the FTP client 61 via the FUSE module 16 and the FTP server 34 (steps S45 and S46). Also, the FUSE module 16 sends the command "return" to the FTP server 34 (step S47). This command "return" indicates that file transfer requested by the command "sendfile" sent in step S25 has been completed.

When it is determined in step S44 that reading of data having the file size held in the session table has been completed, the conversion-processing-unit interface 12 waits for a predetermined time and then updates the size held in the session table. The waiting and the update of the size are performed only when the ongoing-update detecting unit 15 (FIG. 2) detects that an update is in progress, and are not performed when the update is not underway.

Subsequently, the FTP server 34 having received the command "return" in step S47 executes the system call "fstat" on the FUSE module 16 in order acquire the file size (step S48). The FUSE module 16 having been invoked by the system call "fstat" sends the command "getattr" to the conversion-processing-unit interface 12 (step 49). The conversion-processing-unit interface 12 then performs the lookup process on the session table (step S50). In this lookup process, the size of the virtual file held in the session table is read. Then, the conversion-processing-unit interface 12 attaches the read size of the virtual file to the command "return", and returns the command "return" to the FTP server 34 (steps S51 and S52). The FTP server 34 determines whether or not the received size of the virtual file matches the file size that the FTP server 34 has been notified of in step S24.

If the file sizes match, the FTP server 34 determines that reading of the virtual file has been completed. The FTP server 34 thus performs a read termination process in step S53 and in the following steps, which will be described later. If the file sizes do not match, the FTP server 34 determines that there is data that has not been read. The process returns to step S25, in which the FTP server 34 executes on the FUSE module 16 the system call "sendfile", with which a request for transfer of the file having the file size is made.

If the FTP server 34 determines that reading of the virtual file has been completed, the FTP server 34 executes a system call "close" on the FUSE module 16 (step S53). The FUSE module 16 having been invoked by the system call "close" sends a command "close" to the conversion processing unit 13 via the conversion-processing-unit interface 12 (steps S54 and S55). A command "close" is also sent to the dividing-joining processing unit 14 from the conversion processing unit 13 (step S56).

The conversion processing unit 13 having received the command "close" sent in step S55 sends a response command "close return" to the conversion-processing-unit interface 12 (step S57). The conversion-processing-unit interface 12 having received this command sends a response command "return" to the FTP server 34 via the FUSE module 16 (steps S58 and S59).

The FTP server 34 having determined that reading of this file has been completed sends "return message" to the FTP client 61, thereby terminating the file transfer performed by using FTP commands (step S60).

A flowchart of FIG. 4 is a diagram illustrating the state transition illustrated in FIG. 3 as a flow of contents of processes. FIG. 4 illustrates contents of processes performed by the FTP server 34, the FUSE module 16, the conversion-processing-unit interface 12, and the conversion processing unit 13. In this case, the processes performed by the FTP server 34 and the FUSE module 16 are collectively illustrated as one flow.

First, the FTP server 34 determines whether or not a request for acquisition of a file is made by the FTP client 61 (step S101). Upon determining that a request for acquisition of a file is made, the FTP server 34 instructs the conversion-processing-unit interface 12 to open the file (step S102).

The conversion-processing-unit interface 12 having received this file open instruction allocates a session table (step S201). Here, the conversion-processing-unit interface 12 determines whether or not the size of the specified file is zero (step S202). If the size of the file is zero, the conversion-processing-unit interface 12 waits until the size of the file is updated from zero (step S203).

If it is determined in step S202 that the size is not zero, or if the size is updated in step S203, the conversion-processing-unit interface 12 stores data, such as the size and creation time of the specified file, in the session table (step S204). Thereafter, the conversion-processing-unit interface 12 instructs the conversion processing unit 13 to open AV data (step S205). The conversion processing unit 13 having received this instruction performs a process of opening a file containing the specified AV data (step S301).

Further, the FTP server 34 instructs the conversion-processing-unit interface 12 to acquire the size of the file (step S103). In response to the instruction, the conversion-processing-unit interface 12 returns the size of the file (step S206).

Thereafter, the FTP server 34 makes a file transfer request by using the acquired file size (step S104). The conversion-processing-unit interface 12 having received this transfer request updates the size held in the session table (step S207), and makes a read request for reading of AV data to the conversion processing unit 13 (step S208).

The conversion processing unit 13 having received this read request starts transferring the AV data (step S302). The transferred AV data is then transferred to the FTP server 34. The AV data transferred to the FTP server 34 is further transferred to the FTP client 61 (step S105).

After the transfer of the AV data is started, the conversion-processing-unit interface 12 determines whether or not reading of effective data has been finished (step S209). If the conversion-processing-unit interface 12 determines that reading of effective data has been finished, the conversion-processing-unit interface 12 waits for a predetermined period until the file size of the AV data is updated. After the file size is updated, the conversion-processing-unit interface 12 updates the size held in the session table (step S210). If there is no update of the file size even after the predetermined period, the conversion-processing-unit interface 12 determines that reading of the AV data has been finished.

Thereafter, the FTP server 34 instructs the conversion-processing-unit interface 12 to acquire the size of the file (step S106). In response to the instruction, the conversion-processing-unit interface 12 returns the size of the file (step S211). The FTP server 34 then determines whether or not the file size sent in step S206 matches the file size sent in step S211 (step S107). If the file sizes do not match, the process returns to step S104, in which the FTP server 34 makes a request for transfer of not-yet-read data among the data having the updated file size.

If the file sizes match in step S107, the FTP server 34 instructs the conversion-processing-unit interface 12 to close the file (step S108). The conversion-processing-unit interface 12 having received this close instruction performs a file close process (step S212). Then, the conversion processing unit 13 performs a close process on the file in which the AV data is recorded (step S303).

Subsequently, the FTP server 34 instructs the FTP client 61 to terminate the file transfer (step S109).

4. Example of Specific Read Operation

Next, an example of a specific AV data transfer state will be described with reference to FIG. 5.

The example illustrated in FIG. 5 corresponds to a case where AV data obtained by shooting a scene using the camera 40 is recorded in storage included in the FTP server 34 and the AV data recorded in the storage is transferred to the FTP client 61.

First, at a time T11, the camera 40 starts shooting a scene. AV data resulting from the shooting by the camera 40 is transferred to the storage included in the FTP server 34, whereby recording of the AV data is started. At this time, the size of a file that contains the AV data is changed from zero to an amount of recorded data, and, for example, the recording start time is attached to the file, in the FTP server 34.

At a time T12, at which a predetermined time has passed from the start of shooting, the FTP client 61 makes an acquisition request for acquisition of the file containing the AV data resulting from the shooting by the camera 40, to the FTP server 34. It is assumed that the file size of the AV data accumulated in the storage at the time when the FTP server 34 has received this acquisition request is a size X1.

At this time, the FTP server 34 notifies the FTP client 61 of the file size X1. Then, transfer of the AV data having the file size X1 from the FTP server 34 to the FTP client 61 is started. Here, the FTP server 34 detects that the file of the AV data is being updated.

As a result of transfer of the AV data to the FTP client 61 in this manner, the FTP client 61 completes acquisition of the AV data having the size X1 at a time T13. At the time T13, the file size has been updated to a size X2. Accordingly, the FTP server 34 detects that the file size X1 acquired at the start of the file transfer does not match the current file size X2. Once the FTP server 34 detects that the file sizes X1 and X2 do not match, reading of not-yet-transferred AV data (data corresponding to a difference between the sizes X2 and X1) is started. In this way, the FTP client 61 starts acquiring the data corresponding to the difference between the file sizes X2 and X1.

It is assumed that shooting by the camera 40 ends at a time T14 and the FTP server 34 no longer detects that the update is in progress. It is also assumed that the file size at the end of the shooting is a size X3.

At a time T15 which is after the time T14, the FTP client 61 completes acquisition of the AV data having the size X2. At the time T15, the file size has been updated to the size X3 in the FTP server 34. Accordingly, the FTP server 34 detects that the file size X2 of the already-read file does not match the current file size X3. Once the FTP server 34 detects that the file sizes X2 and X3 do not match, reading of not-yet-transferred AV data (data corresponding to a difference between the sizes X3 and X2) is started. In this way, the FTP client 61 starts acquiring the data corresponding to the difference between the sizes X3 and X2.

If the FTP server 34 completes transfer of the data corresponding to the difference between the sizes X3 and X2 at a time T16, the FTP client completes acquisition of the entire AV data (data having the size X3). At the time T16, both the file size of the already-transferred file and the file size of the file stored in the storage are equal to X3, i.e., match, in the FTP server 34. Thus, a file-transfer termination process, such as closing of the file, is performed.

As described above, even if the size of AV data accumulated in storage varies, the entire AV data may be transferred to the FTP client 61 by using FTP. Accordingly, AV data having a variable data size, such as AV data of live video, may be easily read by using a FTP-based file transfer function of an apparatus that functions as the FTP client 61.

In this case, a process of transferring data having a variable size is performed in the FTP server 34 on the basis of comparison between the file size held by the conversion-processing-unit interface 12, which is allocated in the user space of the AV data recording-reproducing apparatus 1, and the file size held by the FTP server 34. When the conversion-processing-unit interface 12 and the FTP server 34 perform this comparison between the file sizes, they communicate with each other via the FUSE module 16 which is prepared in the kernel space. Thus, a control process for continuously reading a file that has a variable size may be performed in the conversion-processing-unit interface 12 and the conversion processing unit 13, which are allocated in the user space. As a result, no modification is made in the kernel space in order to allow the AV data recording-reproducing apparatus 1 according to the embodiment of the present disclosure to continuously read a file having a variable size, compared with a general apparatus that performs file transfer by using FTP.

It is easier to modify modules allocated in the user space than those allocated in the kernel space. Thus, it is relatively easy to configure the conversion-processing-unit interface 12 and the conversion processing unit 13, which are allocated in the user space, so that they perform a process of continuously reading a file having a variable size as in the embodiments of the present disclosure.

Since the conversion-processing-unit interface 12 and the FTP server 34 perform the comparison between the file sizes at the start and end of reading, whether or not reading is to be continued may be determined by performing the comparison the minimum number of times.

If the file size acquired at the start of reading matches the file size acquired at the end of reading, the conversion-processing-unit interface 12 waits until the file size is updated. With this configuration, a case may be handled in which reading of data from the storage is performed faster than writing of data in the storage. Additionally, the conversion-processing-unit interface 12 waits until the file size is updated in step S44 illustrated in FIG. 3 only when the ongoing-update detecting unit 15 (FIG. 2) detects that the file is being updated. Accordingly, the time taken for reading does not increase when data having a determined file size is transferred by using FTP.

In the above-described examples according to the embodiments, the case has been described in which file transfer is performed by using FTP. However, the file transfer is not limited to that based on the FTP, and various protocols for file transfer may be adopted.

Additionally, although virtual files are used as files to be transferred, files other than virtual files may be used.

The present disclosure may take configurations as follows:
1) An audiovisual data transmission system including:
a filesystem module configured to create a file that contains at least one of video data and audio data stored in a storage unit;
a conversion processing unit configured to manage a file created by the filesystem module;
a filesystem-in-userspace module configured to provide an interface between the conversion processing unit and the filesystem module;
an update detecting unit configured to detect an update of at least one of video data and audio data contained in a file; and
a server configured to, in response to an instruction to acquire a file managed by the conversion processing unit received in a state where an update of the file is detected by the update detecting unit, make an inquiry to the conversion processing unit via the filesystem-in-userspace module and repeatedly perform a read process in which the file is read via the filesystem-in-userspace module.

2) The audiovisual data transmission system according to 1),
wherein the filesystem-in-userspace module is allocated in a kernel space of an operating system, and
wherein the conversion processing unit is allocated in a user space of the operating system.

3) The audiovisual data transmission system according to 1) or 2), wherein the filesystem module creates a file to be transferred using the file transfer protocol.

4) The audiovisual data transmission system according to any one of 1) to 3),
wherein the server makes an inquiry regarding the size of the file to the conversion processing unit at least at the start and end of a read process in which the file is read, and
wherein when the size obtained at the start does not match the size obtained at the end, the server continuously performs the read process.

5) The audiovisual data transmission system according to 4), wherein when the size obtained at the start matches the size obtained at the end, the server waits until the size of the file is updated.

6) An audiovisual data transmission method including:
creating a file that contains at least one of video data and audio data stored in a storage unit;
managing a file created in the creating of a file;
providing an interface between a management process performed in the managing of a file and a file creation process performed in the creating of a file, in a kernel space of an operating system;

detecting an update of at least one of video data and audio data contained in a file; and in response to an instruction to acquire a file managed in the managing of a file in a state where an update of the file is detected in the detecting of an update, making an inquiry to the managing of a file via the interface provided in the providing of an interface, and repeatedly performing a read process in which the file is read via the filesystem-in-userspace module.

It should be understood by those skilled in the art that various modifications, combinations, sub-combinations and alterations may occur depending on design requirements and other factors insofar as they are within the scope of the appended claims or the equivalents thereof.

What is claimed is:

1. An audiovisual data transmission system comprising:
a filesystem module configured to create a file that contains at least one of video data and audio data stored in a storage unit;
a conversion processing unit configured to manage a file created by the filesystem module;
a filesystem-in-userspace module configured to provide an interface between the conversion processing unit and the filesystem module;
an update detecting unit configured to detect an update of at least one of video data and audio data contained in a file;
and a server configured to, in response to an instruction to acquire a file managed by the conversion processing unit received in a state where an update of the file is detected by the update detecting unit,
(a) make an inquiry to the conversion processing unit via the filesystem-in-userspace module regarding the size of the file that has been instructed to be acquired
and (b) repeatedly perform a read process in which the file is repeatedly read via the filesystem-in-userspace module based on a comparison between an amount of data acquired by the filesystem-in-userspace module and the size of the file instructed to be acquired.

2. The audiovisual data transmission system according to claim 1,
wherein the filesystem-in-userspace module is allocated in a kernel space of an operating system, and
wherein the conversion processing unit is allocated in a user space of the operating system.

3. The audiovisual data transmission system according to claim 1, wherein the filesystem module creates a file to be transferred using the file transfer protocol.

4. The audiovisual data transmission system according to claim 1,
wherein the server makes an inquiry regarding the size of the file to the conversion processing unit at least at the start and end of a read process in which the file is read, and
wherein when the size obtained at the start does not match the size obtained at the end, the server continuously performs the read process.

5. The audiovisual data transmission system according to claim 4, wherein when the size obtained at the start matches the size obtained at the end, the server waits until the size of the file is updated.

6. An audiovisual data transmission method, executed by a hardware processor, comprising:
creating a file that contains at least one of video data and audio data stored in a storage unit;
managing a file created by the creating of a file;
providing an interface between a management process performed in the managing of a file and a file creation process performed in the creating of a file, in a kernel place of an operating system;
detecting an update of at least one of video data and audio data contained in a file;
in response to an instruction to acquire a file managed in the managing of a file in a state where an update of the file is detected in the detecting of an update,
(a) make an inquiry to the managing of a file via the interface provided in the providing of an interface regarding the size of the file that has been instructed to be acquired,
and (b) repeatedly performing a read process in which the file is repeatedly read via a filesystem-in-userspace module based on a comparison between an amount of data acquired by the filesystem-in-userspace module and the size of the file instructed to be acquired.

* * * * *